July 10, 1962 R. GUILLAUME ETAL 3,043,270
MEANS FOR USE IN SECURING LIVESTOCK AND OTHER ANIMALS
Filed Oct. 24, 1960 2 Sheets-Sheet 1

Inventors
ROGER GUILLAUME
EMILE GUILLAUME

By Toulmin & Toulmin
Attorneys

Inventors
ROGER GUILLAUME
EMILE GUILLAUME

By Toulmin & Toulmin
Attorneys

United States Patent Office 3,043,270
Patented July 10, 1962

3,043,270
MEANS FOR USE IN SECURING LIVESTOCK AND OTHER ANIMALS
Roger Guillaume and Emile Guillaume, both of 238, Rue de la Station, Vielsalm, Belgium
Filed Oct. 24, 1960, Ser. No. 64,427
Claims priority, application Belgium Nov. 5, 1959
5 Claims. (Cl. 119—119)

The present invention has for an object the provision of a gapped ring and link means for use in the securing of livestock or other animals, particularly for incorporation in attachment means in which use is made of a fixed, suspended and flexible chain, along which can slide freely rings coupled to the ends of a bar, the bar and chain forming the sides of a collar for attachment around the neck of the animal.

According to the invention, manually-releasable means for closing a collar for use in securing an animal consist of a ring for engagement with a downwardly-extending chain forming one side of the collar, said ring being gapped to enable it to be passed sideways on to the chain; and a link for connecting the gapped ring to a part forming the other side of the collar, said link having an opening with which the gapped ring can be engaged and which is partly obstructed by a stop part provided on the link, said ring, when the ring and link are in use to close the collar to secure the animal being engaged with the chain and hanging from the link with the gapped portion of the ring uppermost, with the ends of the ring engaged within the opening in the link but separated from each other by the stop part on the link, said stop part projecting into the gap to prevent free rotary movement of the ring; and the ring being disengageable from the chain, to open the collar to free the animal, by moving the ring manually against the action of gravity to move the gapped portion of the ring to a position, within the opening in the link, in which the said gapped portion is clear of the stop part, so that the ring can then be rotated to bring the gapped portion outside the link and into a position in which the chain can pass through the gap in the ring.

Also, according to the invention, means for securing an animal comprise a neck-engaging part forming one side of a collar for the animal; a downwardly-extending chain which is adapted to be secured at each end to a relatively-fixed part and which forms the other side of the said collar; means for connecting the lower end of the neck-engaging part to the chain; a ring gapped to enable it to be passed sideways on to the chain; and a link for connecting the gapped ring to the upper end of the neck-engaging part, said link having an opening with which the gapped ring can be engaged and which is partly obstructed by a stop part provided on the ring; the said ring and link constituting manually-releasable means for closing the collar, and said ring, when the ring and link are in use to close the collar to secure to animal, being engaged with the chain and hanging from the link with the gapped portion of the ring uppermost, with the ends of the ring engaged with the opening in the link but separated from each other by the stop part on the link, said stop part projecting into the gap to prevent free rotary movement of the ring; and the ring being disengageable from the chain, to open the collar to free the animal, by moving the ring manually against the action of gravity to move the gapped portion of the ring to a position, within the opening in the link, in which the said gapped portion is clear of the stop part so that the ring can then be rotated to bring the gapped portion outside the link and into a position in which the chain can pass through the gap in the ring.

Further, according to the invention an arrangement of a gapped ring and a link for use in connection with the securing of livestock and other animals is characterised in that the gapped ring forms part of an attachment collar and has a gap of a width greater than the thickness of any one link of the attachment chain, a portion of the ring acting as a counterweight so as normally to prevent turning of the ring, and the said gapped ring having bevelled ends, which ends normally take support on the rear end of a large opening in a double link and are engageable with both sides of an inclined partition disposed partly longitudinally in the large opening in the double link, thereby preventing the displacement in a rotary direction of the said ring, except when the ring is in a position clear of the free edge of the partition, whereby when the ring is moved into this latter position by hand, the part freed from the double link can be rotated in order to permit presentation of its gap opposite to any one link of the attachment chain, to permit the ring to be disengaged in order to open the collar surrounding the neck of the animal, and thus to free the animal, movement in a contrary sense re-establishing closing of the attachment collar.

The accompanying diagrammatic drawings illustrate, in an explanatory and non-limiting manner, one embodiment of the invention.

FIGURE 1 of the said drawings shows diagrammatically the arrangement of a gapped ring and a special link for closing a collar surrounding the neck of an animal.

Figure 1:
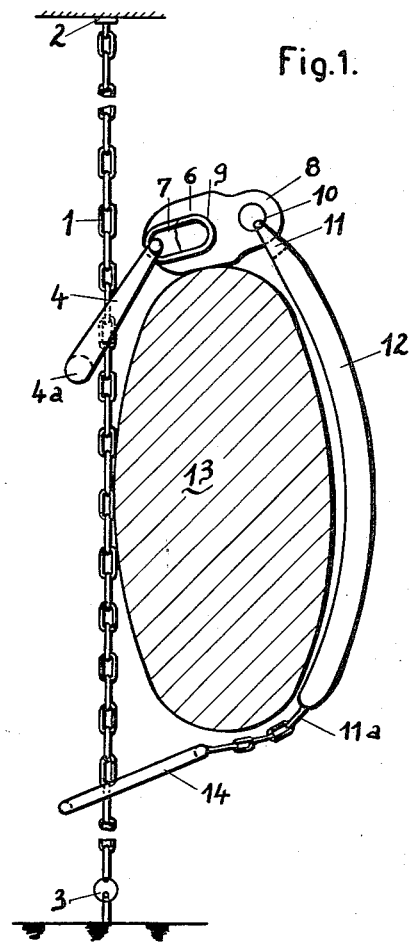

Referring to the above-mentioned figures, 1 represents the attachment chain suspended at 2 and hooked to the ground at 3, the chain being free to flex. By 4 is represented a ring which is engaged with the attachment chain 1 and of which the ends shown bevelled at 4$^b$, 4$^c$ are spaced from each other by a gap 5 (see FIGURE 3). It should be mentioned that the ends 4$^b$ and 4$^c$ are bevelled in order, on the one hand, to facilitate the engagement of the gapped ring 4 with the attachment chain, and the disengagement of the ring 4 from the chain 1, and, on the other hand, to permit the said ring 4 to slide upon an inclined partition 7 referred to below. The ring 4 has at 4$^a$ a diameter which decreases at each side towards the ends 4$^b$, 4$^c$, this portion 4$^a$ of the ring acting as a counterweight tending always to return to its lowest position. By 6 is represented a double link in one piece having, at one side, a part 8 provided with an opening 10 in which is engaged a ring 11 forming the upper end of a bar 12 which is adapted to partly surround the neck 13 of the animal, and of which the other end 11$^a$ is connected, through several chain links, to a closed ring 14 on the attachment chain 1.

The other part of the double link 6 has a large opening 9 of which the end 6$^a$ carries an inclined partition 7 which is disposed partly longitudinally in the large opening 9 and which has an outer edge 7$^a$.

Figure 2:
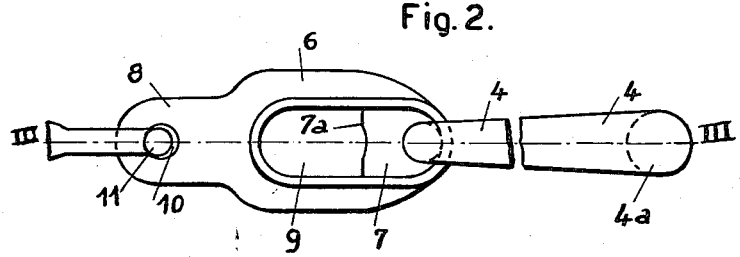
FIGURE 2 represents, on a larger scale, a side view of the gapped ring with the special link.

The device functions as follows:

Referring to FIGURES 1 and 2, the gapped ring and the link are shown therein in use, the animal being held by the collar formed by the parts 14, 12, 6, 4 and the attachment chain 1. Despite the pulling on the collar, the gapped ring 4 remains attached to the link 6 by means of its ends 4$^b$, 4$^c$ which take support on the end 6$^a$ and which cannot disengage because of the partition 7 and the weight of the gapped ring 4, see FIGURE 1, which is obliged always to remain suspended and consequently to be held without being turned. In spite of the shaking or displacement given to it by the animal, the gapped ring remains connected.

Figure 3:
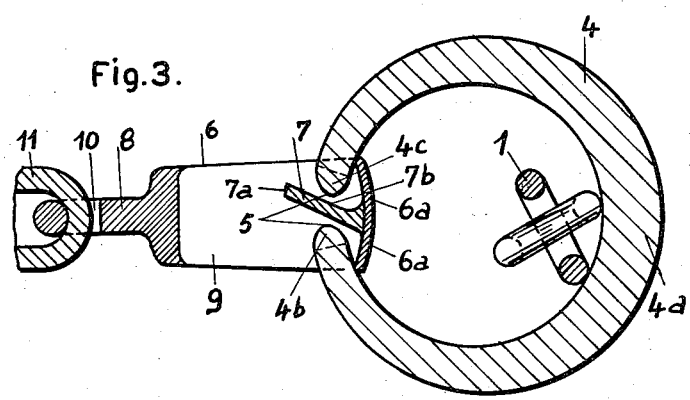
FIGURE 3 is a section on the line III—III, FIGURE 2.
Figure 4:
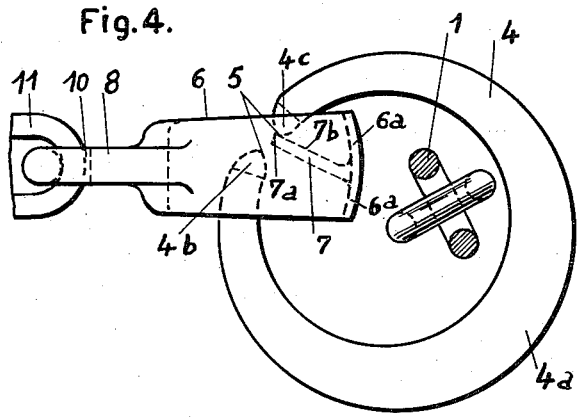
FIGURE 4 shows the gapped ring displaced into an intermediate position.
Figure 5:
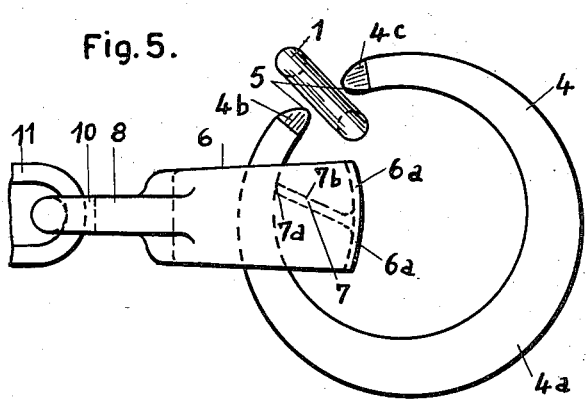
FIGURE 5 shows the gapped ring in a position permitting it to be disengaged from the attachment chain.

If it is now wished to release the animal, when the arrangement is in normal use according to FIGURE 3, it is possible to move or turn by hand the gapped ring 4, even if a pulling persists which tends to keep the ends 4b, 4c against the end 6a, in such a manner as to bring the ring into the position shown in FIGURE 4, which shows the gap 5 almost outside the edge 7a of the partition 7. In order to obtain this position, it suffices, in moving or turning the ring 4, that the end 4c can slide along the face 7b of the partition 7. As a result of the inclined face 7b serving as a guide for the bevelled end 4c, a movement from the position shown in FIGURE 3 to that shown in FIGURE 4 can easily be carried out manually. In order to arrive at the position of FIGURE 5, permitting the obtaining of disengagement of the gapped ring 4, it then suffices to continue the displacement of the gapped ring until its gap 5 is opposite any of the links of the attachment chain 1. The collar can then be opened and the animal freed.

In order to attach the animal, the procedure is opposite to the above and is as follows: After having applied the collar to the neck of the animal, the gapped ring 4 is engaged with the chain 1, allowing the ring next to be turned until the gap 5 is presented, as in FIGURE 4, opposite to the edge 7a of the partition 7 and the ring can then be let fall, due to the counterweight effect of the portion 4a, causing the ring to move over both sides of the partition 7, in order finally to take again the position of FIGURE 3 where it again remains attached to the double link 6.

We claim:

1. Manually-releasable means for closing a collar for use in securing an animal, said means comprising a ring for engagement with a downwardly-extending chain forming one side of the collar, said ring being gapped to enable it to be passed sideways on to the chain; a part forming the other side of the collar; and a link for connecting the gapped ring to said part forming the other side of the collar, said link having an opening with which the gapped ring can be engaged and which is partly obstructed by a stop part provided on the link; said ring, when the ring and link are in use to close the collar to secure the animal, being engaged with the chain and hanging from the link with the gapped portion of the ring uppermost, with the ends of the ring engaged within the opening in the link but separated from each other by the stop part on the link, said stop part projecting into the gap to prevent free rotary movement of the ring; and the ring being disengageable from the chain, to open the collar to free the animal, by moving the ring manually against the action of gravity to move the gapped portion of the ring to a position, within the opening in the link, in which the said gapped portion is clear of the stop part, so that the ring can then be rotated to bring the gapped portion outside the link and into a position in which the chain can pass through the gap in the ring.

2. Means for securing an animal, said means comprising a neck-engaging part forming one side of a collar for the animal; a downwardly-extending chain which is adapted to be secured at each end to a relatively-fixed part and which forms the other side of the said collar; means for connecting the lower end of the neck-engaging part of the chain; a ring being gapped to enable it to be passed sideways on to the chain; and a link for connecting the gapped ring to the upper end of the neck-engaging part, said link having an opening with which the gapped ring can be engaged and which is partly obstructed by a stop part provided on the ring; the said ring and link constituting manually-releasable means for closing the collar, and said ring, when the ring and link are in use to close the collar to secure to animal, being engaged with the chain and hanging from the link with the gapped portion of the ring uppermost, with the ends of the ring engaged with the opening in the link but separated from each other by the stop part on the link, said stop part projecting into the gap to prevent free rotary movement of the ring; and the ring being disengageable from the chain, to open the collar to free the animal, by moving the ring manually against the action of gravity to move the gapped portion of the ring to a position, within the opening in the link, in which the said gapped portion is clear of the stop part so that the ring can then be rotated to bring the gapped portion outside the link and into a position in which the chain can pass through the gap in the ring.

3. An arrangement of a gapped ring and a link for use in connection with the securing of livestock and other animals, said gapped ring forming part of an attachment collar and having a gap of a width greater than the thickness of a link of an attachment chain, a portion of the ring acting as a counterweight so as normally to prevent turning of the ring, and the said gapped ring having bevelled ends, which ends normally take support on the rear end of a large opening in a double link and are engageable with both sides of an inclined partition disposed partly longitudinally in the large opening in the double link, thereby preventing the displacement in a rotary direction of the said ring, except when the ring is in a position clear of the free edge of the partition, whereby when the ring is moved into this latter position by hand, the part freed from the double link can be rotated in order to permit presentation of its gap opposite to any one link of the attachment chain, to permit the ring to be disengaged in order to open the collar surrounding the neck of the animal, and thus to free the animal, movement in a contrary sense re-establishing closing of the attachment collar.

4. Arrangement of a gapped ring and a link for use in connection with the securing of livestock or other animals, according to claim 3, wherein the diameter of the body of the gapped ring decreases from a diametrical line passing through the gap, towards each of the ends of the ring.

5. Arrangement of a gapped ring and a link for use in connection with the securing of livestock and other animals, according to claim 3, wherein the presence of a double bevel at each end of the gapped ring, in order, on the one hand, to facilitate engagement of the gapped ring with, or disengagement of the ring from, the attachment chain, and, on the other hand, to facilitate movement of the said gapped ring over the inclined partition of the double link.

References Cited in the file of this patent

UNITED STATES PATENTS

| | | |
|---|---|---|
| 545,203 | Jensen et al. | Aug. 27, 1895 |
| 2,743,702 | Sullivan | May 1, 1956 |